(12) United States Patent
Noh et al.

(10) Patent No.: US 11,338,272 B2
(45) Date of Patent: May 24, 2022

(54) CATALYST CAPABLE OF DIRECTLY DECOMPOSING UREA AND METHOD FOR UREA DECOMPOSITION USING THE SAME

(71) Applicant: DAEYOUNG C&E, Gangwon-do (KR)

(72) Inventors: Sei Youn Noh, Gangwon-do (KR);
Nam Ha Kim, Gangwon-do (KR);
Byung Han Seo, Gangwon-do (KR);
Hyo Sang Lee, Gangwon-do (KR);
Myoung Jin Kha, Gangwon-do (KR);
Jong Min Won, Gyeonggi-do (KR);
Gyeong Ryun Choi, Gyeonggi-do (KR)

(73) Assignee: DAEYOUNG C&E, Gangwon-do (KR)

( * ) Notice: Subject to any disclaimer, the term of this patent is extended or adjusted under 35 U.S.C. 154(b) by 35 days.

(21) Appl. No.: 17/009,993

(22) Filed: Sep. 2, 2020

(65) Prior Publication Data
US 2021/0113998 A1  Apr. 22, 2021

(30) Foreign Application Priority Data

Oct. 18, 2019  (KR) .......................... 10-2019-0130124

(51) Int. Cl.
| | |
|---|---|
| *B01J 23/644* | (2006.01) |
| *B01J 21/06* | (2006.01) |
| *B01J 37/02* | (2006.01) |
| *B01J 35/02* | (2006.01) |
| *B01J 37/08* | (2006.01) |

(52) U.S. Cl.
CPC ......... *B01J 23/6445* (2013.01); *B01J 21/063* (2013.01); *B01J 21/066* (2013.01); *B01J 35/026* (2013.01); *B01J 37/0225* (2013.01); *B01J 37/08* (2013.01); *B01J 2523/3712* (2013.01)

(58) Field of Classification Search
CPC .... B01J 23/6445; B01J 21/063; B01J 21/066; B01J 35/026; B01J 37/0228; B01J 37/08; B01J 2523/3712
USPC .......................... 502/304, 350; 423/352, 354
See application file for complete search history.

(56) References Cited

U.S. PATENT DOCUMENTS 8,148,295 B2 *  4/2012  Augustine ................ B01J 37/03
502/350
2009/0260346 A1 * 10/2009  Gekas ................... F01N 3/2066
60/274

FOREIGN PATENT DOCUMENTS

| JP | 2009-214045 | 9/2009 |
| KR | 10-1727923 | 4/2017 |
| KR | 10-2019-0053496 | 5/2019 |
| KR | 10-2019-0068189 | 6/2019 |

OTHER PUBLICATIONS

Xiaojiang Yao et al., "Selective catalytic reduction of NOx by NH3 over CeO2 supported on TiO2: Comparison of anatase, brookite, and rutile." Applied Catalysis B: Environmental 208, pp. 82-93. (Year: 2017).*

(Continued)

*Primary Examiner* — Patricia L. Hailey

(57) ABSTRACT

The present disclosure relates to a catalyst for directly decomposing urea, a method for preparing the same and a system for decomposing urea including the same, whereby the efficiency of decomposing urea to ammonia may be improved while preventing the formation of a byproduct such as biuret at temperatures of 200° C. or below by controlling the oxygen composition of the catalyst including titania and ceria.

16 Claims, 10 Drawing Sheets

(56) References Cited

OTHER PUBLICATIONS

Office Action dated Jul. 15, 2020 corresponding to Korean Patent Application No. 10-2019-0130124, 5 pages.

* cited by examiner

CATALYST CAPABLE OF DIRECTLY DECOMPOSING UREA AND METHOD FOR UREA DECOMPOSITION USING THE SAME

CROSS-REFERENCE TO RELATED APPLICATION

This application claims priority of Korean Patent Application No. 10-2019-0130124, filed on Oct. 18, 2019, in the KIPO (Korean Intellectual Property Office), the disclosure of which is incorporated herein entirely by reference.

BACKGROUND OF THE INVENTION

Field of the Invention

The present disclosure relates to a catalyst for directly decomposing urea and a method for decomposing urea using the same, more particularly to a catalyst for directly decomposing urea, which has improved ability of decomposing urea to ammonia by controlling the oxygen distribution of the catalyst and, thereby, inducing the decomposition of a byproduct such as biuret, and a method for decomposing urea using the same.

Description of the Related Art

Nitrogen oxide ($NO_x$) is produced mainly from the combustion of fossil fuels and is generated from mobile sources such as ships or automobiles or stationary sources such as power plants or incinerators. The nitrogen oxide is regarded as one of the main causes that pollute the atmosphere through acid rain and smog. As the regulations on air pollution are becoming stricter recently, a lot of researches are being conducted on the reduction of nitrogen compounds such as nitrogen oxide using reductants.

As a method for removing nitrogen compounds exhausted from stationary sources, a nitrogen dioxide conversion catalyst, which uses ammonia, etc. as a reductant, titanium dioxide (titania, $TiO_2$) as a support and vanadium oxide ($V_2O_5$) as an active catalytic component, is widely used. However, the use of ammonia as a reductant in the selective catalytic reduction reaction has a problem in that, since the ammonia is produced from hydrolysis under a high-temperature, high-pressure condition, it requires an excessively large reactor and excessive consumption of energy to maintain the temperature and pressure condition.

In addition, when urea is simply pyrolyzed, biuret is produced as a byproduct at temperatures of 200° C. or lower, which decreases the efficiency of ammonia production and lowers catalytic activity for selective catalytic reduction.

SUMMARY OF THE INVENTION

The present disclosure is directed to providing a new catalyst for decomposing urea, which is capable of improving the efficiency of decomposing urea to ammonia while preventing the formation of a byproduct such as biuret at temperatures of 200° C. or lower.

The present disclosure provides a catalyst for decomposing urea, the catalyst including: a titania support; and ceria supported on the titania, wherein the oxygen composition of the catalyst satisfies Equation 1.

$$0.8 \leq O_\alpha + O_\beta / O_{total} \leq 0.87 \quad \text{[Equation 1]}$$

In Equation 1, $O_\alpha$ represents lattice oxygen, $O_\beta$ represents surface oxygen and $O_{total}$ represents total oxygen in the catalyst.

In an exemplary embodiment of the present disclosure, the catalyst for decomposing urea has a ceria content of 5.0-10.0 wt. % based on the total catalyst and the catalyst for decomposing urea is sintered at a temperature of 350-450° C. to satisfy the oxygen composition described above.

In an exemplary embodiment of the present disclosure, the catalyst for decomposing urea further includes antimony or zirconia.

In an exemplary embodiment of the present disclosure, the catalyst for decomposing urea further includes antimony, and the content of antimony is 1.5-2.5 wt. % based on the total catalyst.

In an exemplary embodiment of the present disclosure, the urea decomposition catalyst is sintered at a temperature of 550-650° C. to satisfy the oxygen composition described above.

In an exemplary embodiment of the present disclosure, the catalyst for decomposing urea further includes zirconia, and the content of zirconia is 1.5-2.5 wt. % based on the total catalyst.

In an exemplary embodiment of the present disclosure, the catalyst for decomposing urea is sintered at a temperature of 450-550° C. to satisfy the oxygen composition described above.

The present disclosure also provides a method for decomposing urea using the catalyst for decomposing urea described above, which includes: a step of injecting urea into a reactor equipped with the catalyst at a temperature of 180-200° C.; and a step of conducting a first reaction of decomposing urea to ammonia in the reactor.

In an exemplary embodiment of the present disclosure, a second reaction whereby biuret, which is a byproduct produced from the first reaction, is decomposed again is conducted by the catalyst for decomposing urea in the reactor, so that the efficiency of decomposing urea to ammonia is improved.

According to a catalyst for directly decomposing urea and a method for decomposing urea using the same of the present disclosure, the efficiency of decomposing urea to ammonia may be improved while preventing the formation of a byproduct such as biuret at temperatures of 200° C. or below by controlling the oxygen composition of the catalyst including titania and ceria.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
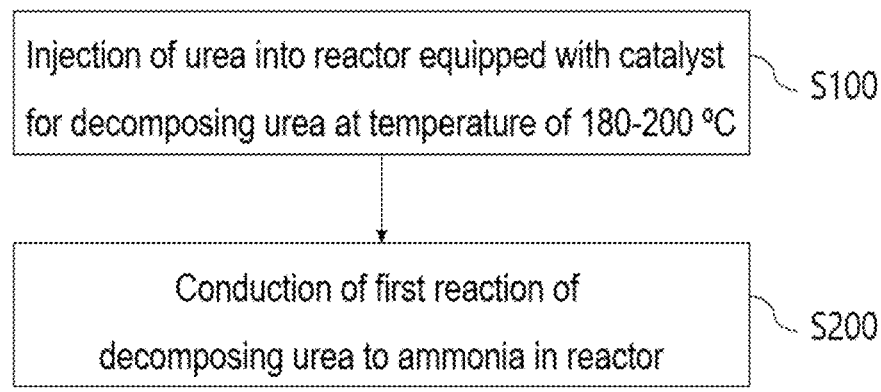
FIG. 1 is a block diagram describing a method for decomposing urea of the present disclosure.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

The present disclosure relates to a catalyst for directly decomposing urea and a method for decomposing urea using the same. In general, when urea is pyrolyzed, biuret is produced as a byproduct at temperatures of 200° C. or lower, which decreases the efficiency of ammonia production and lowers catalytic activity for selective catalytic reduction.

Therefore, in order to solve the problem described above, the present disclosure provides a catalyst including a titania support and ceria, which has improved efficiency of decomposing urea to ammonia due to a controlled oxygen composition and can directly decompose urea even at 200° C. or lower, and a method for preparing the same. In an exemplary embodiment of the present disclosure, the oxygen composition of the catalyst may be controlled with heat treatment temperature and/or use of another catalyst component (antimony or zirconia).

The present disclosure provides a catalyst for decomposing urea, the catalyst including: a titania support; and ceria supported on the titania, wherein the oxygen composition of the catalyst satisfies Equation 1.

$$0.8 \leq O_\alpha + O_\beta / O_{total} \leq 0.87 \qquad \text{[Equation 1]}$$

In Equation 1, $O_\alpha$ represents lattice oxygen, $O_\beta$ represents surface oxygen and $O_{total}$ represents total oxygen in the catalyst.

The present disclosure is based on the fact that urea decomposition efficiency is maximized when the ratio of the surface oxygen, the lattice oxygen and the total oxygen is in a range from 0.8 to 0.87. In particular, when the oxygen composition of the catalyst satisfies Equation 1, the urea decomposition efficiency (urea conversion) may be 80% or higher.

According to the examples of the present disclosure, it can be seen that the catalyst for decomposing urea of the present disclosure has improved urea decomposition efficiency. Specifically, when the oxygen composition satisfies the condition of $0.8 \leq O_\alpha + O_\beta / O_{total} \leq 0.87$, the urea decomposition efficiency of the catalyst may be maximized.

Meanwhile, the urea catalyst of the present disclosure may be prepared by impregnating ceria in a titania support. Specifically, after weighing ceria based on the total weight of the catalyst and dissolving in an aqueous solution, a slurry may be prepared by mixing the prepared titania support with the aqueous solution in which ceria is dissolved.

The catalyst for decomposing urea may have a ceria content of 5.0-10.0 wt. % based on the total weight of the catalyst. The urea decomposition efficiency of the finally prepared catalyst tends to increase as the ceria content is increased when the content is low. However, the efficiency may decrease on the contrary if the increase is higher than a certain range. That is to say, the ceria content may be specifically 5.0-10.0 wt. % of the total catalyst as described above.

As described above, the catalyst for decomposing urea according to the present disclosure is prepared by supporting ceria on titania and then drying and sintering the same. As a precursor for supporting ceria on titania, one or more selected from a group consisting of ceria nitrate (Ce(NO$_3$)$_3$.xH$_2$O), ceria acetate (Ce(CH$_3$CO$_2$)$_3$.xH$_2$O), ceria oxalate (Ce$_2$(C$_2$O$_4$)$_3$.xH$_2$O) and ceria oxide (CeO$_2$) may be used, although not being limited thereto.

The catalyst for decomposing urea may be sintered at a temperature of 350-450° C. to satisfy the oxygen composition of Equation 1. If the sintering temperature is higher, the efficiency of urea decomposition may be decreased. Therefore, it is preferred that the catalyst is sintered at a temperature of 350-450° C. Specifically, the sintering may be performed for 2-4 hours. The sintering process may be performed in various types of furnaces including a tube furnace, a convection furnace, a grate furnace, etc. without special limitation.

In addition, the catalyst for decomposing urea according to the present disclosure may further include antimony or zirconia.

In a specific exemplary embodiment, the catalyst for decomposing urea may further include antimony.

Specifically, the urea catalyst of the present disclosure may be prepared by impregnating ceria and antimony in a titania support. Specifically, after weighing antimony based on the total weight of the catalyst and dissolving in an aqueous solution, a slurry may be prepared by mixing the prepared titania support with the aqueous solution in which antimony is dissolved.

The catalyst for decomposing urea may have an antimony content of 1.5-2.5 wt. % based on the total weight of the catalyst. The urea decomposition efficiency of the finally prepared catalyst tends to increase as the antimony content is increased when the content is low, like the ceria content. However, the efficiency may decrease on the contrary if the increase is higher than a certain range. That is to say, the antimony content may be specifically 1.5-2.5 wt. % of the total catalyst as described above.

Then, an antimony/titania catalyst for decomposing urea is prepared by supporting antimony on the titania and then drying and sintering the same. As a precursor for supporting antimony on the titania, antimony trichloride ($SbCl_3$) may be used.

Specifically, the sintering may be performed at a temperature of 550-650° C. to achieve the oxygen composition of Equation 1.

Subsequently, ceria is supported on the prepared antimony/titania catalyst. Ceria is weighed based on the total weight of the catalyst and dissolved in an aqueous solution. The catalyst for decomposing urea may have a ceria content of 5.0-10.0 wt. % based on the total catalyst. Then, after preparing a slurry by sufficiently mixing and stirring the prepared antimony/titania support with the aqueous solution in which ceria is dissolved, a ceria/antimony/titania catalyst is prepared by drying and sintering the same. The sintering temperature may be 350-450° C.

In another exemplary embodiment, the catalyst for decomposing urea may further include zirconia.

Specifically, the urea catalyst of the present disclosure may be prepared by impregnating ceria and zirconia in titania. Specifically, after weighing zirconia based on the total weight of the catalyst and dissolving in an aqueous solution, a slurry may be prepared by mixing the prepared titania support with the aqueous solution in which zirconia is dissolved.

The catalyst for decomposing urea may have a zirconia content of 1.5-2.5 wt. % based on the catalyst. The urea decomposition efficiency of the catalyst tends to increase as the zirconia content is increased when the content is low, like the ceria content. However, the efficiency may decrease on the contrary if the increase is higher than a certain range. That is to say, the zirconia content may be specifically 1.5-2.5 wt. % of the total catalyst as described above.

Then, a zirconia/titania catalyst for decomposing urea may be prepared by supporting zirconia on the titania and then drying and sintering the same.

Specifically, the sintering may be performed at a temperature of 450-550° C. to achieve the oxygen composition of Equation 1.

Subsequently, ceria is supported on the prepared zirconia/titania catalyst. Ceria is weighed based on the total weight of the catalyst and dissolved in an aqueous solution. The catalyst for decomposing urea may have a ceria content of 5.0-10.0 wt. % based on the total catalyst. Then, after preparing a slurry by sufficiently mixing and stirring the prepared antimony/titania support with the aqueous solution in which ceria is dissolved, a ceria/zirconia/titania catalyst is prepared by drying and sintering the same. The sintering temperature may be 350-450° C.

According to the examples of the present disclosure, it can be seen that the catalyst including antimony or zirconia has improved urea decomposition ability as compared to the catalyst wherein only ceria is supported on the titania support.

In addition, the present disclosure provides a method for decomposing urea using the catalyst for decomposing urea.

Specifically, the method for decomposing urea includes: a step of injecting urea into a reactor equipped with the catalyst at a temperature of 180-200° C. (S100); and a step of conducting a first reaction of decomposing urea to ammonia in the reactor (S200) (see FIG. 1).

A second reaction whereby biuret, which is a byproduct produced from the first reaction, is decomposed again may be conducted by the catalyst for decomposing urea in the reactor, so that the efficiency of decomposing urea to ammonia is improved.

Urea may be transported from the urea reservoir to the exhaust gas line through the urea injection line. The reactor may refer to a urea injection line for transporting urea to the exhaust gas line.

Hereinafter, the present disclosure is described in more detail through examples and test examples.

However, the following examples and test examples merely exemplify the present disclosure and the present disclosure is not limited by the following examples and test examples. In the following examples, DT51 and G5 refer to titania supports of Crystal Inc. DT51 is an anatase-phase titania support and G5 is an amorphous-phase titania support. According to the present disclosure, superior urea decomposition effect can be achieved regardless of the titania phase of the support as long as a specific oxygen composition is satisfied by supporting ceria on the support and then sintering the same, as will be described in detail.

EXAMPLES

Example 1

Ce/DT51 (10 wt. % Ce)

For preparation of a Ce/DT51 catalyst for decomposing urea to ammonia, an aqueous ceria solution was prepared by mixing ceria nitrate ($Ce(NO_3)_3 \cdot xH_2O$) in distilled water such that the content of ceria was 10 wt. % based on the total weight of a titania DT51support.

Then, after mixing the prepared aqueous ceria solution with titania (DT51) to prepare a slurry and removing water using a rotary vacuum evaporator, the slurry was dried sufficiently in a dryer at 103° C. for at least one day to completely remove water contained in fine pores.

Then, a ceria/titania catalyst was prepared by sintering in a tubular electric furnace at 400° C. for 4 hours under air atmosphere.

Example 2

Ce/Zr/DT51 (2.0 wt. % Zr)

For preparation of a Ce/Zr/DT51 catalyst for decomposing urea to ammonia, an aqueous antimony solution was prepared by mixing zirconia in distilled water such that the content was 2 wt. % based on the total weight of the catalyst. Then, after mixing the prepared aqueous antimony solution with titania (DT51) to prepare a slurry and removing water using a rotary vacuum evaporator, the slurry was dried sufficiently in a dryer at 103° C. for at least one day to completely remove water contained in fine pores. Then, an antimony/titania catalyst was prepared by sintering in a tubular electric furnace at 500° C. for 4 hours under air atmosphere.

Subsequently, an aqueous ceria solution was prepared by mixing ceria nitrate ($Ce(NO_3)_3 \cdot xH_2O$) in distilled water such that the content was 10 wt. % based on the total weight of the catalyst. Then, after mixing the prepared aqueous ceria solution with the antimony/titania catalyst to prepare a slurry and removing water using a rotary vacuum evaporator, the slurry was dried sufficiently in a dryer at 103° C. for at least one day to completely remove water contained in fine pores.

Then, a ceria/antimony/titania catalyst was prepared by sintering in a tubular electric furnace at 400° C. for 4 hours under air atmosphere.

Example 3

Ce/Sb/DT51

A ceria/antimony/titania catalyst was prepared in the same manner as in Example 2 except that zirconium was replaced with antimony.

The zirconium/titania catalyst was sintered at 600° C. under air atmosphere.

Example 4

Ce/G5

Ceria/titania (Ce/G5) catalysts (Example 4-1 and Example 4-2) were prepared by sintering at 600° C. and 700° C.

Example 5

A ceria/titania (Ce/P25) catalyst was prepared in the same manner as in Example 1 except that a P-25 titania support (~10% rutile phase, the remainder anatase phase) was used.

COMPARATIVE EXAMPLES

Comparative Example 1

DT51

Titania (DT51) was prepared.

Comparative Example 2

G5

An amorphous-phase titania support (G5) was sintered at different temperatures. The G5 support of Comparative Example 2-1 was not sintered and the supports of Comparative Examples 2-2 to 2-7 were sintered for 4 hours at different temperatures.

Comparative Example 3

Zr/DT51

A zirconium/titania (Zr/DT51) catalyst was prepared in the same manner as in Example 1 except that ceria was replaced with zirconium.

The zirconium/titania catalyst was sintered at 500° C. under air atmosphere.

Comparative Example 4

$CeO_2$

Ceria ($CeO_2$, Sigma Co.) was prepared.

Comparative Example 5

$ZrO_2$

Zirconia ($ZrO_2$, Sigma Co.) was prepared

Comparative Example 7

Ce/DT51

Catalysts were prepared in the same manner as in Example 1 by changing sintering temperatures from 350-450° C. to other ranges (Comparative Example 7-1: 300° C., 4 hr; Comparative Example 7-5: 800° C., 4 hr).

Comparative Example 8

Ce/DT51

Catalysts were prepared in the same manner as in Example 1 by varying the Ce content from 11.0 wt. % to 15.0 wt. % (Comparative Example 8-1: 11.0 wt. %; Comparative Example 8-5: 15.0 wt. %).

TEST EXAMPLES

Test Example 1

Ammonia Yield ($NH_3$ Yield) Ammonia Depending on Urea Injection Temperature

In order to investigate the urea removal efficiency of the reductant injection system 10 for a selective catalytic reduction reaction of the present disclosure depending on urea injection temperature, ammonia yield ($NH_3$ yield) was measured under a space velocity condition of 60,000 $hr^{-1}$ using titania.

The experiment was conducted under the condition of urea concentration=400 ppm, oxygen=3.0 vol. %, carrier gas inflow rate=1000 cc/min, space velocity=60,000 $hr^{-1}$, catalyst amount=0.5 g and residence time=0.06 second.

Figure 2:
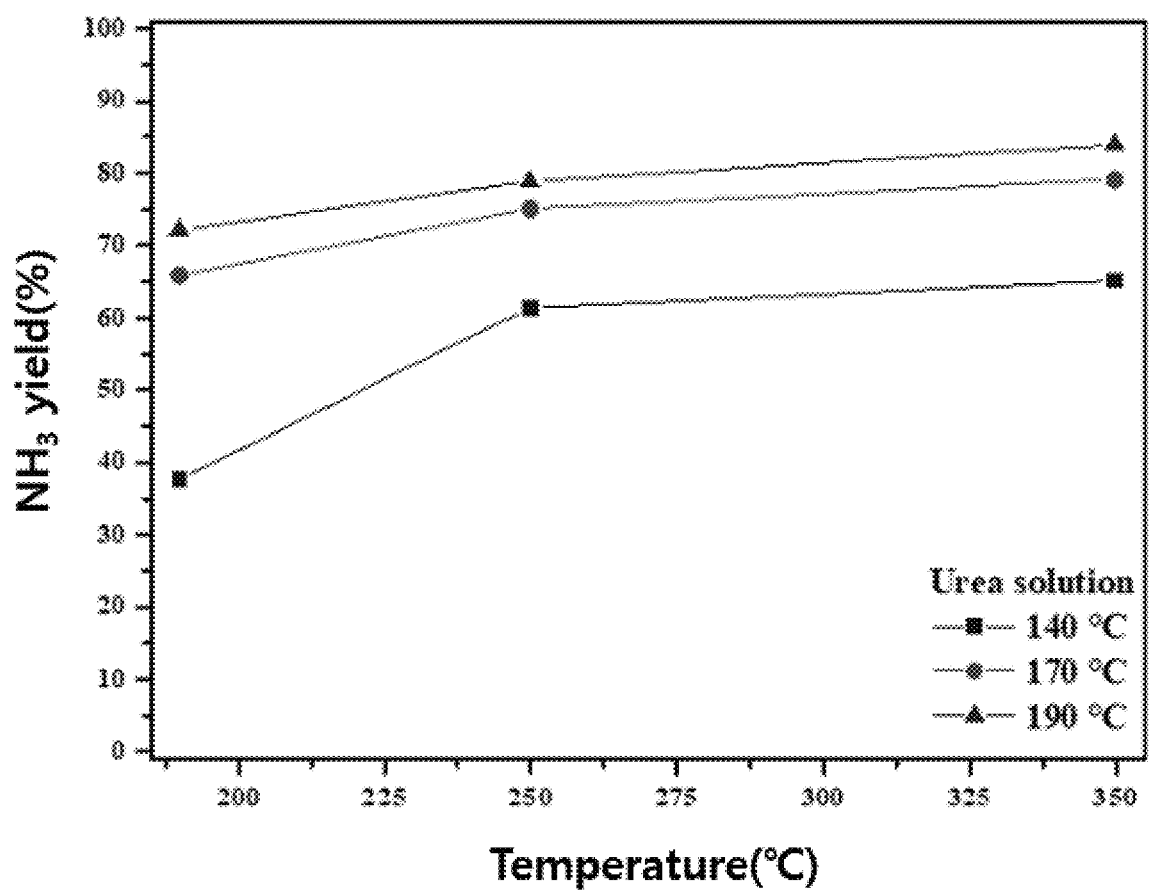
FIG. 2 schematically shows ammonia yield depending on urea injection temperature.

The result is shown in FIG. 2.

FIG. 2 shows ammonia yield depending on urea injection temperature. Referring to FIG. 2, it can be seen that the ammonia yield is increased as the urea injection temperature is increased. In particular, the ammonia yield was the most superior when the urea injection temperature was 190° C.

A urea injection temperature exceeding 190° C. may be unfavorable because salts that cannot be decomposed easily such as CYA, ammelide, etc. are formed when urea is introduced.

Test Example 2

Ammonia Yield ($NH_3$ Yield) Ammonia Depending on Catalyst

In order to investigate the urea removal efficiency of the catalyst of the present disclosure, ammonia yield ($NH_3$ yield) was measured for the catalysts prepared in the examples and comparative examples under a space velocity condition of 60,000 $hr^{-1}$. The result is shown in FIG. 3. The experimental condition and measurement method are as follows.

Experimental Condition

Experiment was conducted under the condition of urea concentration=400 ppm, oxygen=3.0 vol. %, carrier gas inflow rate=1000 cc/min, space velocity=60,000 $hr^{-1}$, catalyst amount=0.5 g and residence time=0.12second. The space velocity is a measure of the amount of a gas that can be treated by a catalyst, and is represented as a ratio of the volume of the catalyst with respect to the total amount (volume) of the gas.

Measurement Method

Ammonia yield was calculated according to Equation 2.

$$NH_3 \text{ yield } (\%) = \frac{(C_{inletUrea} - C_{outletUrea}) - C_{outletNH3}}{C_{inletUrea}} \times 100. \quad \text{[Equation 2]}$$

Figure 3A:
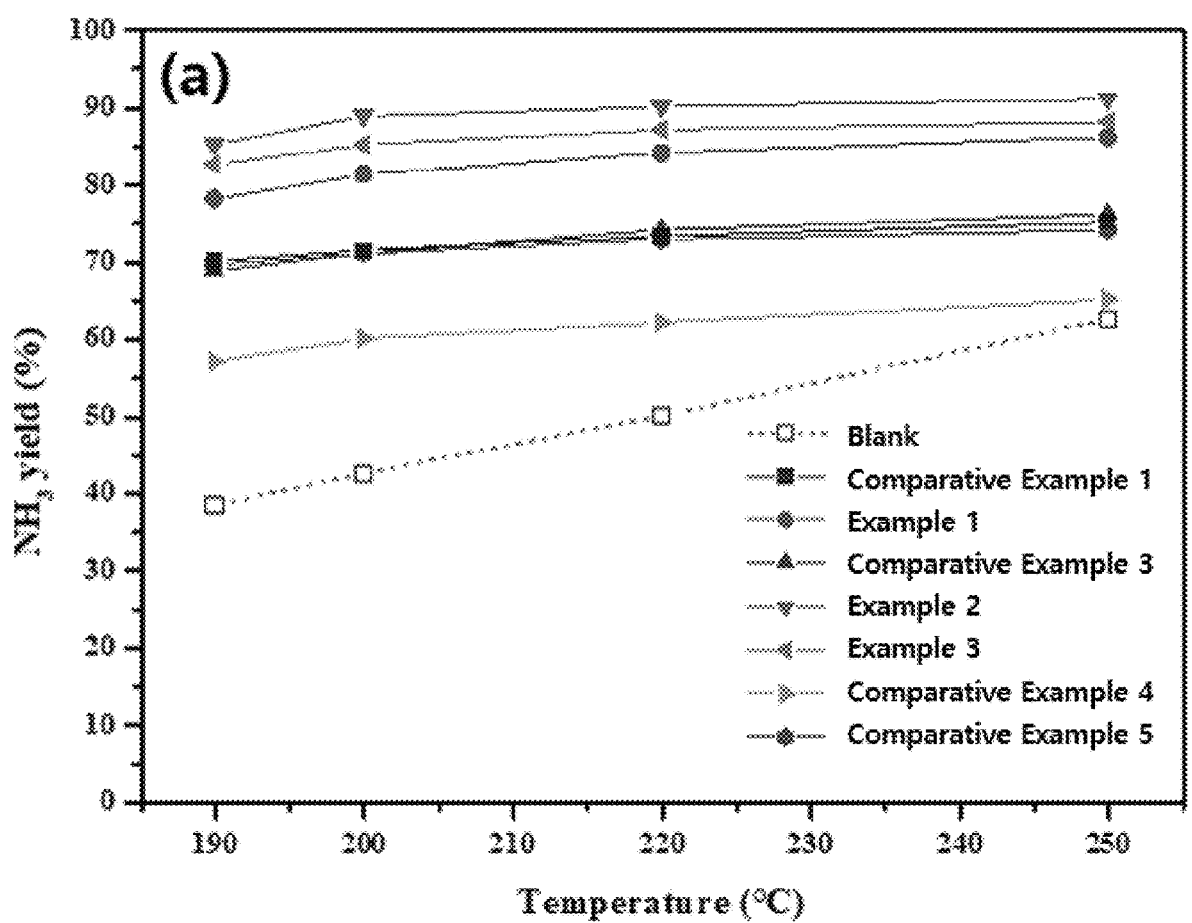
FIGS. 3A, 3B, and 3C show a result of urea decomposition experiment depending on temperature for examples and comparative examples.
Figure 3B:
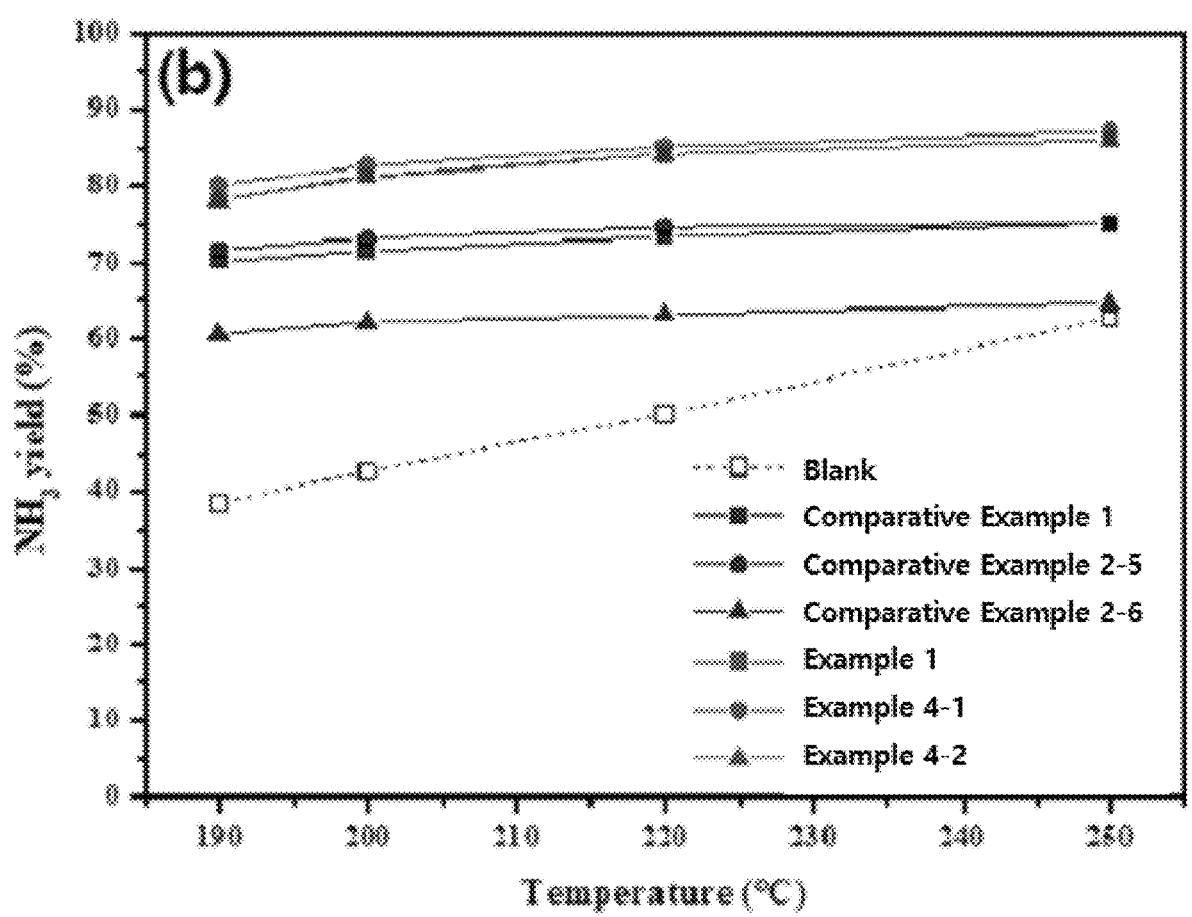
Figure 3C:
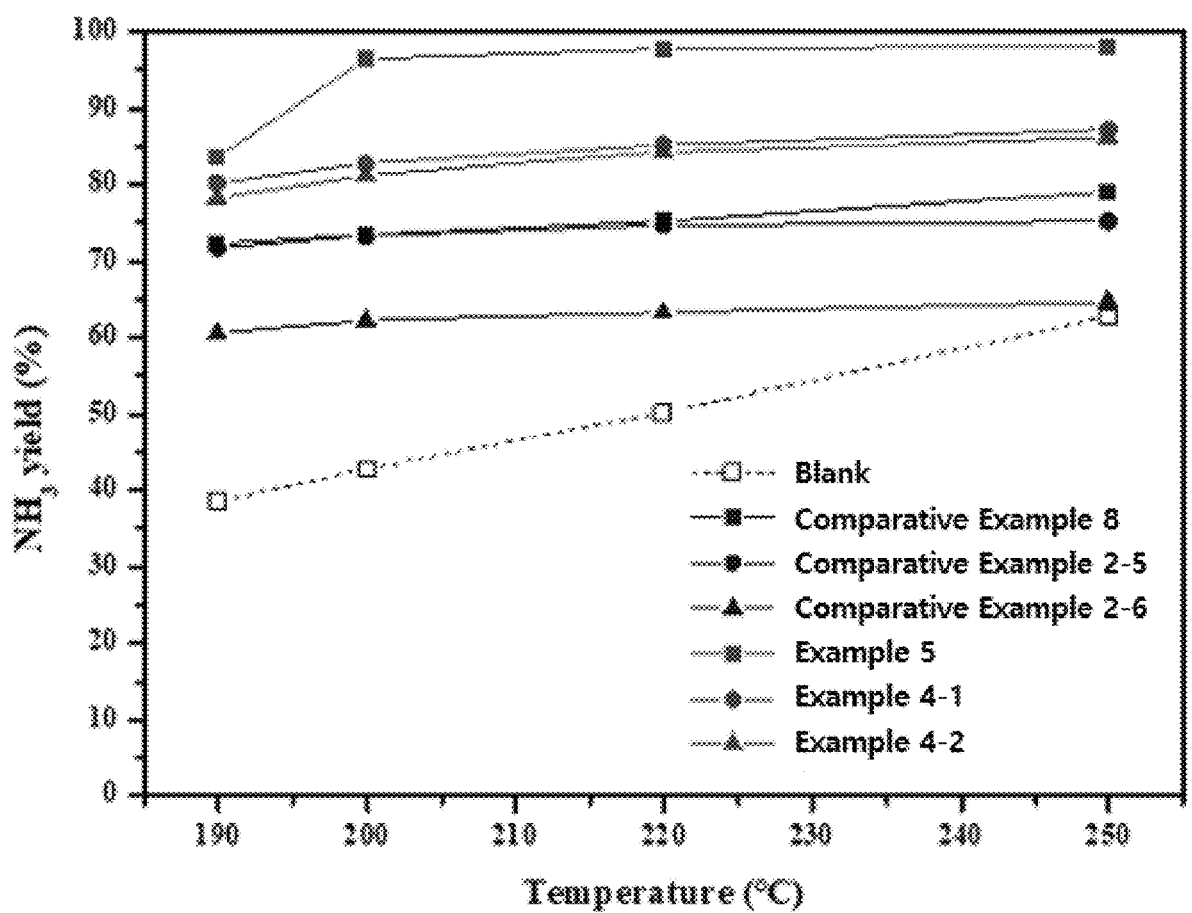

FIGS. 3A, 3B, and 3C show a result of urea decomposition experiment depending on temperature for examples and comparative examples.

Referring to FIGS. 3A and 3B, it can be seen that the catalysts prepared in the examples have improved ammonia yield as compared to the catalysts prepared in the comparative examples and that the ammonia yield is improved as the temperature of the carrier gas is increased.

In particular, it can be seen that the ceria/zirconium/titania catalyst of Example 2 exhibits an ammonia yield of 88.7% and 89.5% at 200° C. and 220° C., respectively. In addition, it can be seen that, also for the different TiO2support (G5), superior ammonia decomposition efficiency is achieved when the oxygen composition satisfies the condition of the present disclosure through the sintering temperature and the addition of Ce (Example 4).

In particular, referring to FIG. 3C, it can be seen that the titania support including the rutile phase in part exhibits very high urea decomposition efficiency.

Test Example 3

Measurement of Oxygen Composition of Catalyst

The oxygen composition of the catalysts for decomposing urea prepared in the examples and comparative examples was measured. Specifically, after measuring lattice oxygen, surface oxygen and total oxygen for each catalyst, $O_\alpha+O_\beta/O_{total}$ was calculated. In addition, O 1s and Ce 3d XPS analysis was performed to investigate the oxygen composition and Ce oxidation number of the G5 $TiO_2$, Ce, Ce/Zr and Ce/Sb catalysts depending on sintering temperature. Here, $O_\alpha$ represents lattice oxygen, $O_\beta$ represents surface oxygen and $O_{total}$ represents total oxygen in the catalyst.

Figure 4:
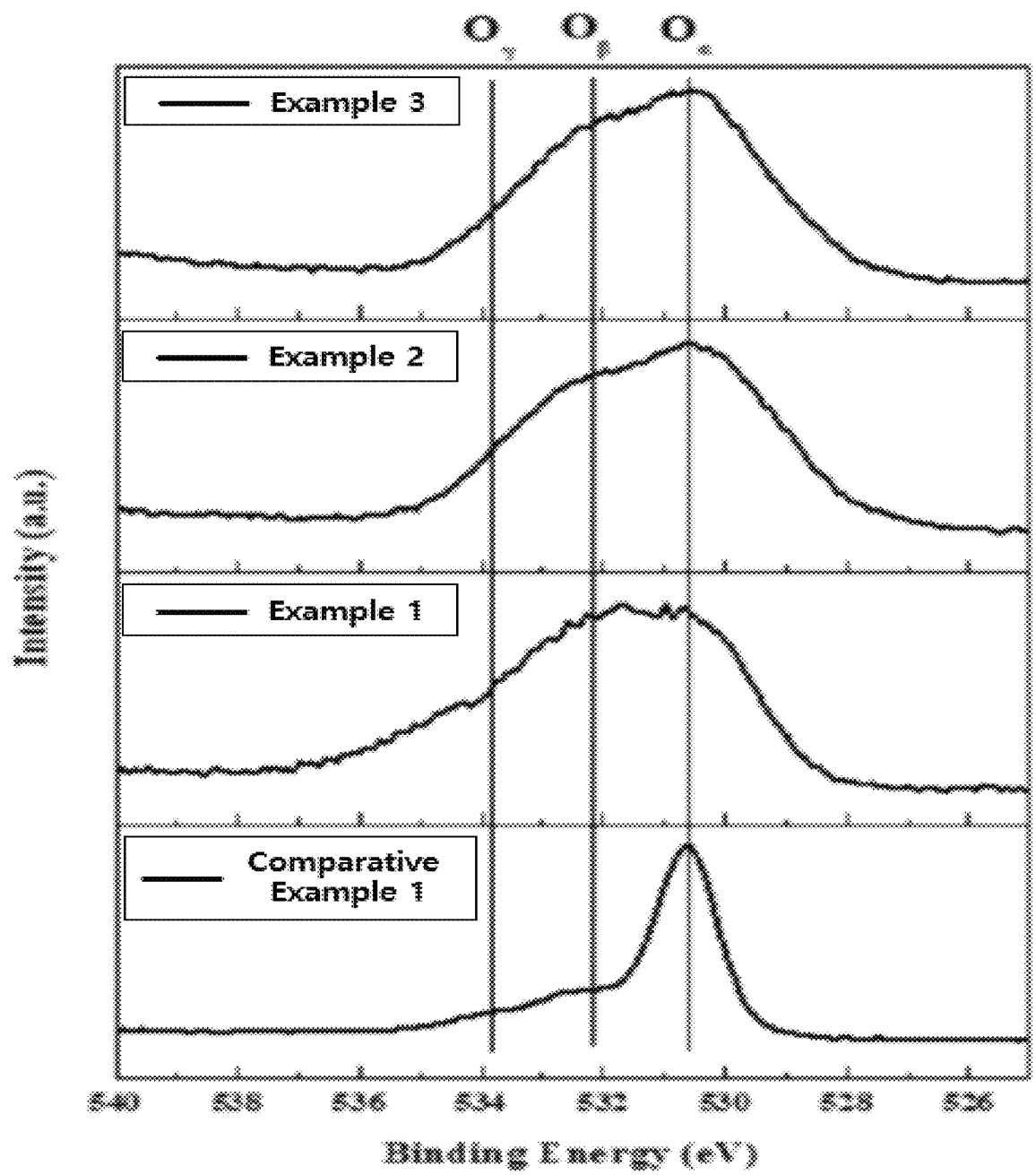
FIG. 4 shows a result of analyzing O 1s spectra for examples and comparative examples.

FIG. 4 shows the O 1s spectra of the catalysts of the examples and comparative examples. Table 1shows the oxygen composition obtained from the XPS analysis result and Table 2shows the cerium composition obtained from the XPS analysis.

TABLE 1

| O 1s | O ratio (%) | | | |
|---|---|---|---|---|
| | Comp. Ex. 1 | Ex. 1 | Ex. 2 | Ex. 3 |
| $O_\alpha$ (lattice oxygen) | 57.40 | 48.32 | 46.57 | 50.12 |
| $O_\beta$ (surface oxygen) | 23.53 | 36.11 | 38.99 | 36.59 |
| $O_\gamma$ (surface $OH^-$) | 19.06 | 15.55 | 14.42 | 13.28 |

TABLE 2

| Ce 3d | Ce ratio (%) | | |
|---|---|---|---|
| | Ex. 1 | Ex. 2 | Ex. 3 |
| $Ce^{4+}$ | 80.96 | 72.14 | 63.49 |
| $Ce^{3+}$ | 19.03 | 27.85 | 36.5 |

Referring to FIGS. 3A-4, it can be seen that superior urea decomposition efficiency is achieved when the oxygen composition satisfies the condition of the present disclosure.

In addition, referring to FIGS. 3A-3C and Tables 1 and 2, it can be seen that the addition of antimony or zirconia increases reaction activity as compared to the ceria/titania catalyst. It is thought that the increased proportion of $Ce_2O_3$ ($Ce^{3+}$) leads to increased oxygen mobility in the catalyst.

Figure 5:
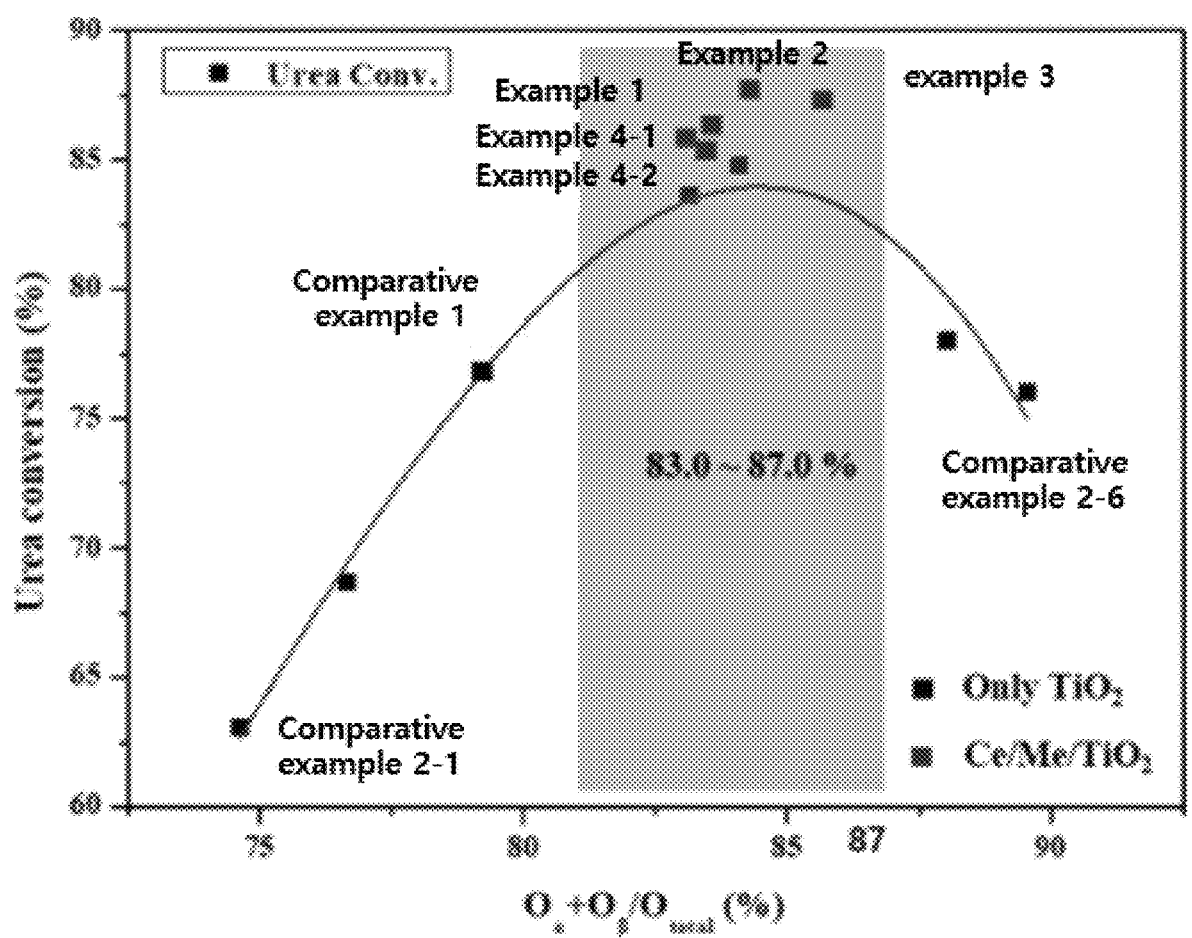
FIG. 5 shows a result of measuring urea decomposition efficiency depending on the oxygen composition of catalysts in Test Example 3.

FIG. 5 shows a result of measuring urea decomposition efficiency depending on the oxygen composition of catalysts. In FIG. 5, the oxygen composition values on the x-axis were calculated from the XPS analysis result.

The correlation between the oxygen composition and the conversion rate is shown. The urea conversion rate was the highest when the proportion of $O_\alpha+O_\beta$ in $TiO_2$ was between 0.83 and 0.87. In particular, for Comparative Example 1 wherein the oxygen composition of $TiO_2$ was not between 0.83 and 0.87, the oxygen composition could satisfy the range of 0.83-0.87 by supporting of Ce, Ce/Zr or Ce/Sb and urea conversion rate was increased.

In addition, for G5 (600) and G5 (700), the oxygen composition of $TiO_2$ was between 0.83 and 0.87 before supporting of Sb or Zr, the urea conversion rate was increased further by the addition of the metal.

Test Example 4

Biuret Decomposition Experiment

Figure 6A:
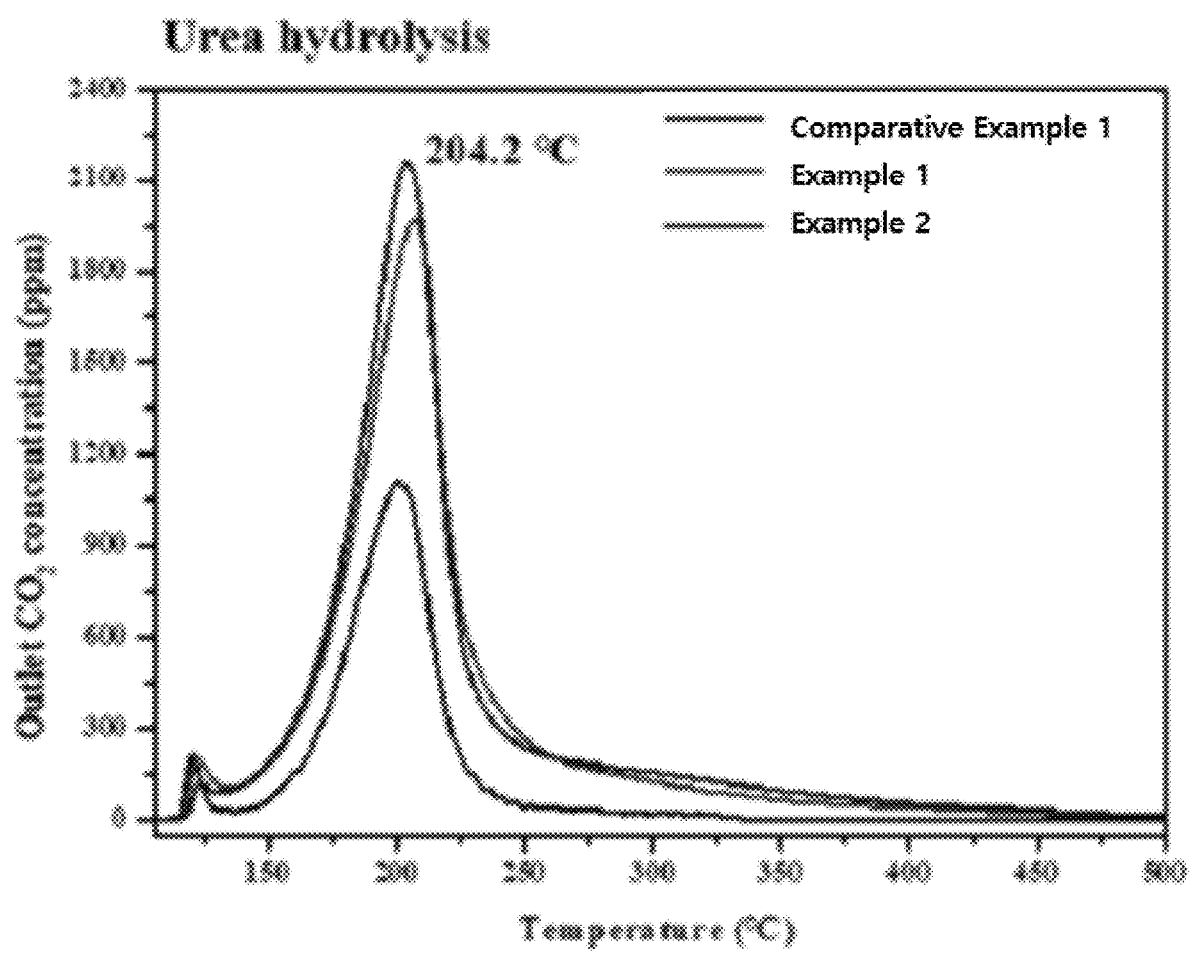
FIGS. 6A and 6B shows a result of experimenting the re-decomposition of biuret, which is a byproduct produced during conversion of urea to ammonia, in Test Example 4.
Figure 6B:
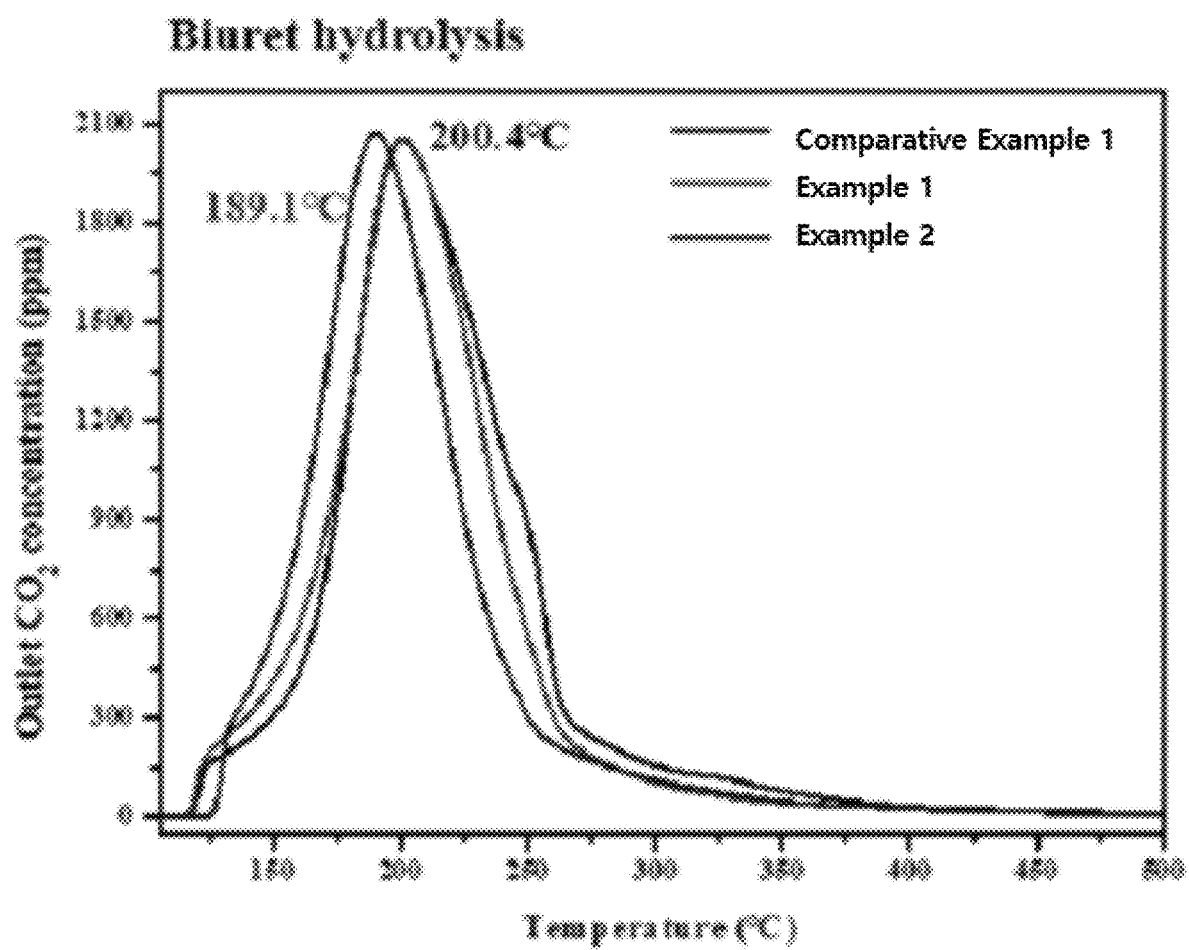

Experiment of the re-decomposition of biuret, which is a byproduct produced during conversion of urea to ammonia, was conducted. The result is shown in FIGS. 6A and 6B. For the experiment, solid biuret was mixed at the same weight ratio.

Referring to FIGS. 6A and 6B, it can be seen that urea decomposition efficiency is improved greatly if Ce is added to titania such that the oxygen composition satisfies the condition of the present disclosure (the $CO_2$ concentration is increased due to decomposition of urea, see FIG. 6A). In addition, referring to FIG. 6B, it can be seen that the decomposition temperature of biuret is decreased as Zr is added and, therefore, the decomposition of urea and its byproduct biuret occurs actively around 190° C. This means that the catalyst according to the present disclosure allows the decomposition of urea and biuret in situ and, thereby, maximizes ammonia yield.

Test Example 5

Conversion Rate Depending on Ceria Content

Urea conversion rate was investigated while varying the content (wt. %) of Ce. The result is shown in Table 3.

TABLE 3

| $TiO_2$ | Total area ratio | |
|---|---|---|
| | Total $Co_2$ mole | Urea conversion ratio |
| Ce 1 | 0.2799 | 84.81 |
| Ce 3 | 0.2822 | 85.51 |
| Ce 5 | 0.2936 | 88.97 |
| Ce 7 | 0.2987 | 90.51 |
| Ce 10 | 0.3228 | 97.81 |
| Ce 15 | 0.2915 | 88.33 |

It can be seen that, very high urea conversion efficiency was achieved when the ceria was 5-10 wt. %.

Test Example 6

Conversion Rate Depending on Sintering Temperature

Urea conversion rate was investigated while varying sintering temperature. The result is shown in Table 4.

TABLE 4

| $TiO_2$ | Total area ratio | | |
|---|---|---|---|
| | Total $Co_2$ mole | Urea conversion rate | $H_2$—TPR area |
| 300° C. | 0.2869 | 86.93 | 5.12 |
| 400° C. | 0.3228 | 97.81 | 5.20 |
| 500° C. | 0.2606 | 78.96 | 4.78 |
| 600° C. | 0.2708 | 82.06 | 2.70 |
| 700° C. | 0.2195 | 66.51 | 1.42 |
| 800° C. | 0.1826 | 55.33 | 0.43 |

Referring to Table 4, it can be seen that high urea conversion efficiency was achieved when the sintering temperature was about 400° C. Therefore, a sintering temperature of 350-450° C. is preferred.

Test Example 7

TPRO (Temperature-Programmed Re-Oxidation) Analysis

The amount of oxygen species that can be used by the catalyst through re-oxidation of consumed oxygen species was investigated by evaluating the re-oxidation ability of the catalyst. After reducing the catalyst by introducing $H_2/N_2$ balance gas to the catalyst at 200° C., which is the main reaction temperature, oxygen was flown while increasing temperature from 100° C. to 500° C. and the amount of re-oxidized oxygen was measured from TCD signals.

Figure 7:
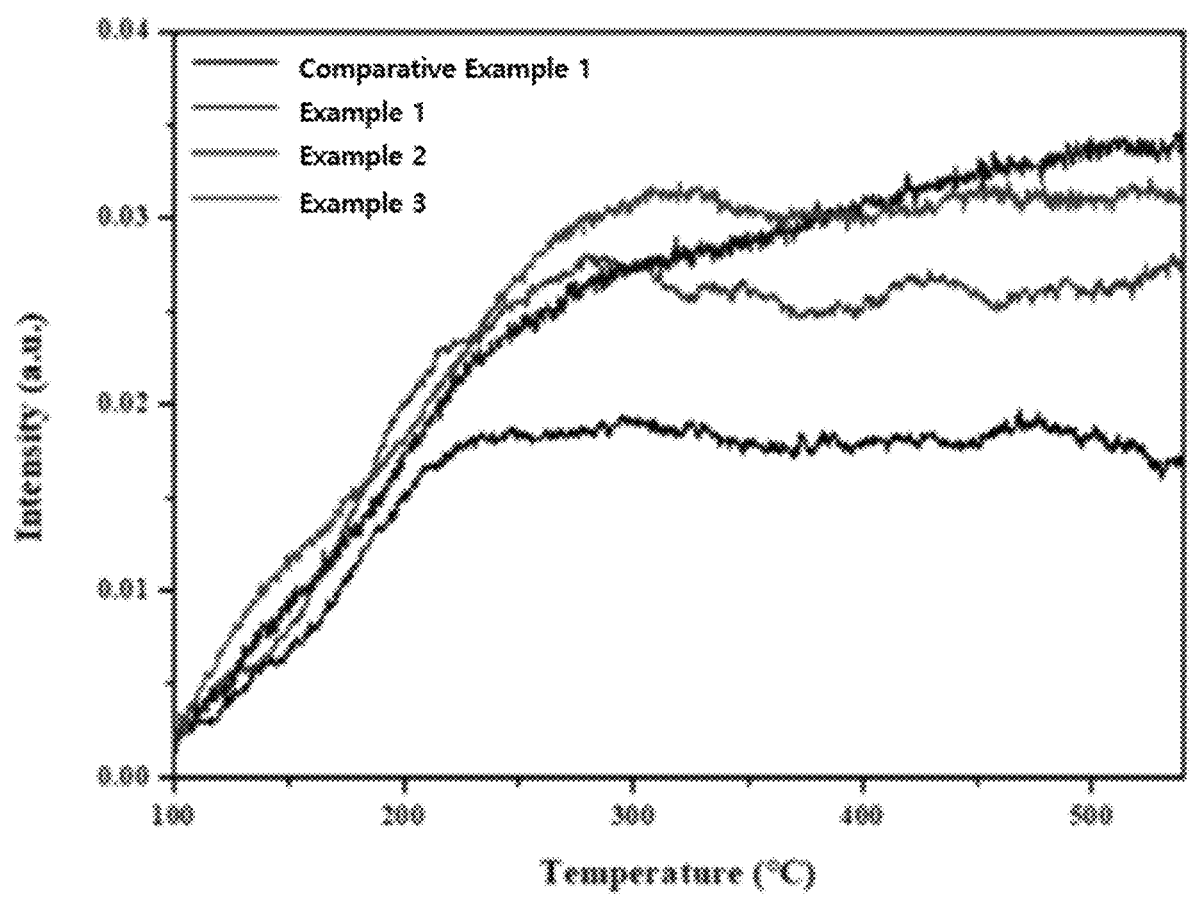
FIG. 7 shows a TPRO analysis result.

FIG. 7 shows the TPRO analysis result.

Referring to FIG. 7, it can be seen that the addition of Ce and metal elements (Zr, Sb) increases the amount of re-oxidized oxygen and, therefore, improves the ability of participating in urea decomposition.

Test Example 8

Analysis of Urea Decomposition Depending on Change in Temperature

The urea decomposition efficiency of the catalysts for decomposing urea prepared in the examples (Example 4-1, Example 4-2, Example 5) and the comparative examples (Comparative Example 2-5, Comparative Example 2-6, Comparative Example 8) was measured. In order to investigate the urea removal efficiency of the catalyst for decomposing urea of the present disclosure in a selective catalytic reduction, $H_2$ consumption (a.u.) was measured under the space velocity condition of 60,000 $hr^{-1}$ using the catalysts of the examples and the comparative examples.

The experiment was conducted under the condition of urea concentration=400 ppm, oxygen=3.0 vol. %, carrier gas inflow rate=1000 cc/min, space velocity=60,000 $hr^{-1}$, catalyst amount=0.5 g and residence time=0.16 second.

Figure 8:
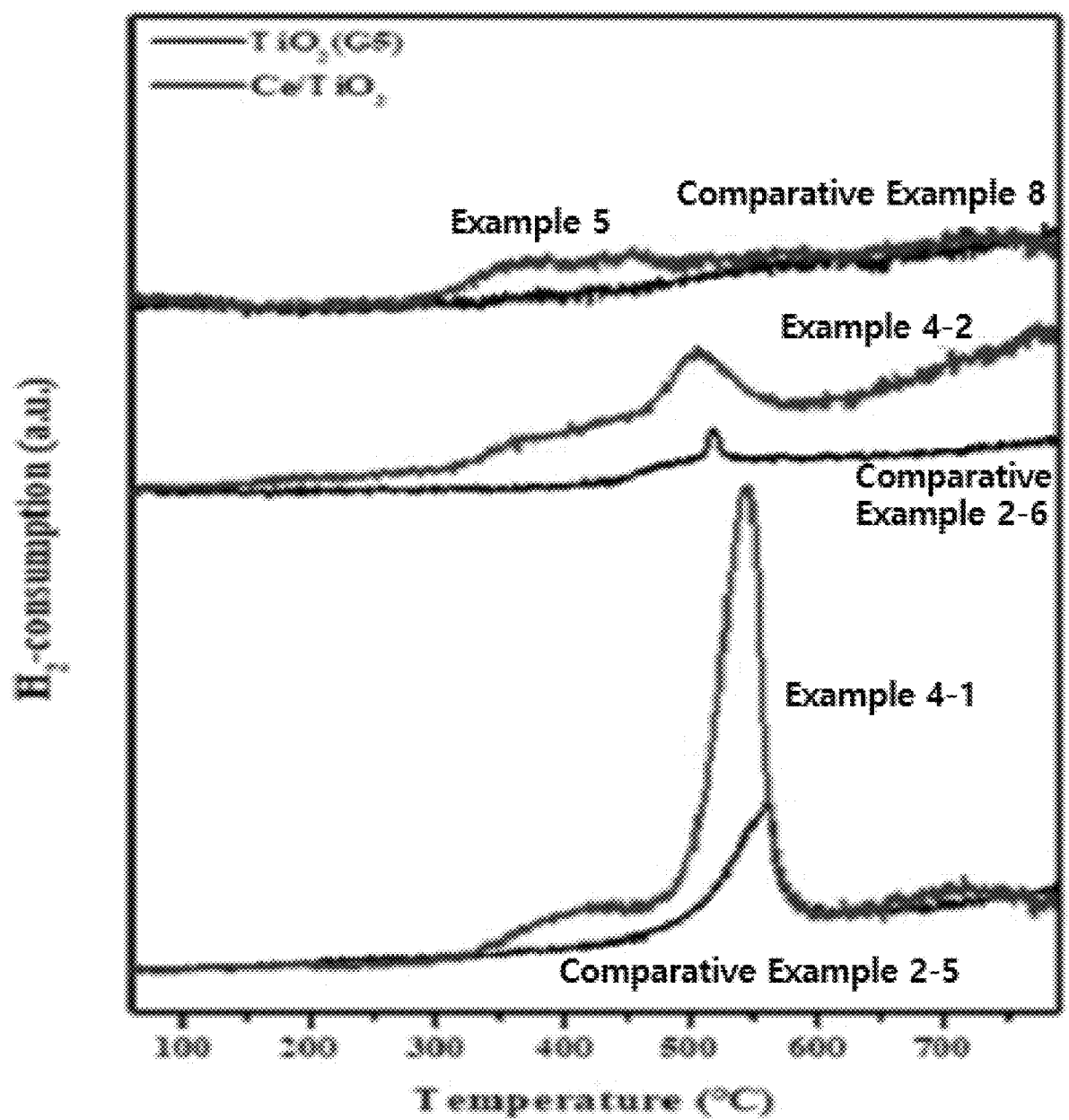
FIG. 8 shows a result of measuring the urea decomposition efficiency of catalysts in Test Example 8.

The result is shown in FIG. 8.

FIG. 8 shows the result of measuring the urea decomposition efficiency of the catalysts. As shown in FIG. 8, the catalysts of the examples showed higher urea decomposition efficiency as compared to the catalysts of the comparative examples. It can be seen that superior urea decomposition efficiency can be achieved by supporting ceria on the titania support. In addition, it can be seen that superior urea decomposition efficiency can be achieved when the content of ceria is 5.0-10.0 wt. % based on the total weight of the catalyst for decomposing urea.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method for decomposing urea using a catalyst, comprising:
    injecting urea into a reactor equipped with the catalyst at a temperature of 180-200° C.; and
    conducting a first reaction of decomposing urea to ammonia in the reactor,
    wherein the catalyst for decomposing urea comprising:
        a titania support; and
        ceria supported on the titania,
        wherein the catalyst has been sintered, and has an oxygen composition satisfying Equation 1, $$0.8 \leq O_\alpha + O_\beta / O_{total} \leq 0.87 \quad \text{[Equation 1]}$$

where $O_\alpha$ represents lattice oxygen, $O_\beta$ represents surface oxygen and $O_{total}$ represents total oxygen in the catalyst.

2. The method for decomposing urea of claim 1, wherein the catalyst has a ceria content of 5.0-10.0 wt. % based on the total catalyst.

3. The method for decomposing urea of claim 2, wherein the catalyst is sintered at a temperature of 350-450° C. to satisfy an oxygen composition satisfying Equation 1.

4. The method for decomposing urea of claim 1, wherein the catalyst further comprising antimony or zirconia.

5. The method for decomposing urea of claim 4, wherein the catalyst further comprising antimony, wherein the content of antimony is 1.5-2.5 wt. % based on the total catalyst.

6. The method for decomposing urea of claim 5, wherein the catalyst is sintered at a temperature of 550-650° C. to satisfy an oxygen composition satisfying Equation 1.

7. The method for decomposing urea of claim 4, wherein the catalyst further comprising zirconia, wherein the content of zirconia is 1.5-2.5 wt. % based on the total catalyst.

8. The method for decomposing urea of claim 7, wherein the catalyst is sintered at a temperature of 450-550° C. to satisfy an oxygen composition satisfying Equation 1.

9. The method for decomposing urea of claim 1, further comprising:
   a second reaction whereby biuret, which is a byproduct produced from the first reaction, wherein said second reaction is conducted by the catalyst for decomposing urea in the reactor, so that the efficiency of decomposing urea to ammonia is improved.

10. The method for decomposing urea of claim 9, wherein the catalyst has a ceria content of 5.0-10.0 wt. % based on the total catalyst.

11. The method for decomposing urea of claim 10, wherein the catalyst is sintered at a temperature of 350-450° C. to satisfy an oxygen composition satisfying Equation 1.

12. The method for decomposing urea of claim 9, wherein the catalyst further comprises antimony or zirconia.

13. The method for decomposing urea of claim 12, wherein the catalyst further comprises antimony, wherein the content of antimony is 1.5-2.5 wt. % based on the total catalyst.

14. The method for decomposing urea of claim 13, wherein the catalyst is sintered at a temperature of 550-650° C. to satisfy an oxygen composition satisfying Equation 1.

15. The method for decomposing urea of claim 12, wherein the catalyst further comprises zirconia, wherein the content of zirconia is 1.5-2.5 wt. % based on the total catalyst.

16. The method for decomposing urea of claim 15, wherein the catalyst is sintered at a temperature of 450-550° C. to satisfy an oxygen composition satisfying Equation 1.

* * * * *